Fred T. Roberts,
Robert E. Roberts,
INVENTORS.

United States Patent Office 3,223,760
Patented Dec. 14, 1965

1

3,223,760
METHOD OF MAKING HOSE
Fred T. Roberts and Robert E. Roberts, Wilton, Conn., assignors to Fred T. Roberts & Company, Wilton, Conn., a partnership
Original application Mar. 10, 1958, Ser. No. 720,190. Divided and this application July 31, 1962, Ser. No. 215,241
2 Claims. (Cl. 264—94)

The present invention relates to a hose and to its method of manufacture.

It is an object of the present invention to provide a reinforced, flexible, elongate hose which is capable of being coiled when not in use without injury to the hose, and which may be clamped to fittings without distortion of the reinforcing members. This is accomplished by providing an elongate hose member with a smooth molded outer surface and with a plurality of wire reinforcements disposed therein and embedded in the elongate member in predetermined spaced relationship so that the hose is reinforced throughout its length by the flexible reinforcing member. The hose in its normal finished condition is made in relatively long lengths, with the reinforcements extending uniformly throughout the length of the hose. The reinforcing member is preferably in the form of a helically coiled spring member in which the convolutions are spaced in a predetermined manner, although the reinforcements may be in the form of spaced annular members each of which comprises a single coil with the ends thereof secured together by elastomeric material or separated so that the coil may be radially expanded. The body of the hose is formed of elastomeric material, preferably of a vulcanizable composition of a natural or synthetic rubber, or of elastomeric plastic material, such as polyvinyl chloride.

The present application is a division of our application Serial No. 720,190, filed March 10, 1958, now abandoned which is a continuation-in-part of our Patent No. 2,830,622, granted April 15, 1958, which describes the general method of manufacture of a hose which is also utilized in the manufacture of the hose of the present invention. In the aforesaid patent the hose is made by a novel method wherein a body of elastomeric material, preferably in sleeve or tubular form, is disposed on a mandrel on which it may be expanded. Annular reinforcements are then located on the exterior of the body, and the mandrel is slightly expanded to cause the body to grip the reinforcements and hold them in place. Thereafter, an outer layer may be positioned over the reinforcements and body. The outer layer can be of elastomeric material having wear-resistant properties or other desired characteristics, or can be of fabric impregnated with elastomeric material. The assembly is then removed from the mandrel and inserted into a mold having a cylindrical cavity, the ends of the body attached in an airtight manner to the end portions of the mold, and fluid under pressure applied to the interior of the hose so as to cause the outer layer to be pressed against the cavity of the mold to form a smooth, cylindrical outer surface, while the body forming the interior of the hose is pressed into engagement with the reinforcements so as to embed the same therein and also pressed against the body forming the outer portion of the hose so as to become united thereto, at the same time forming a corrugated interior with the reinforcements embedded in spaced corrugations within the hose. The annular reinforcements used are slightly expansible and enable the hose to be readily inserted on fittings and yet effectively hold the hose to the fittings when the usual external clamps are applied. The hose produced in accordance with the aforesaid method is capable of being severed into shorter lengths so that the operator of a gas station, or the like, can provide various hose sections of different lengths of hose member without requiring large stocks of separate lengths of hose to be kept on hand.

The hose of the present invention is designed to be formed and utilized in relatively long lengths of several feet, or greater, and can be made in lengths as high as 25 or 50 feet, depending upon the length of the mandrel used. Such hose is useful in connection with the transportation of fluids, as for the filling of fuel or oil tanks, for attachment to gasoline pumps, for use with vacuum cleaners and the like, and many other uses where hose of long length is desired. The hose referred to may be readily formed with fabric reinforcements embedded therein and provide smooth surfaced, highly flexible and durable conduits of relatively long lengths useful for many purposes in addition to those described above.

Other features and advantages of the invention will be apparent from the specification and claims when considered in connection with the drawings in which:

Figure 1:
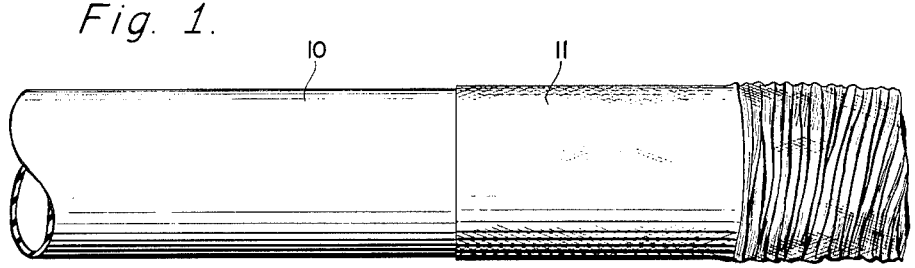
FIGURE 1 is a view in elevation illustrating the assembly of the body portion of the hose in an initial stage of the process.
Figure 2:
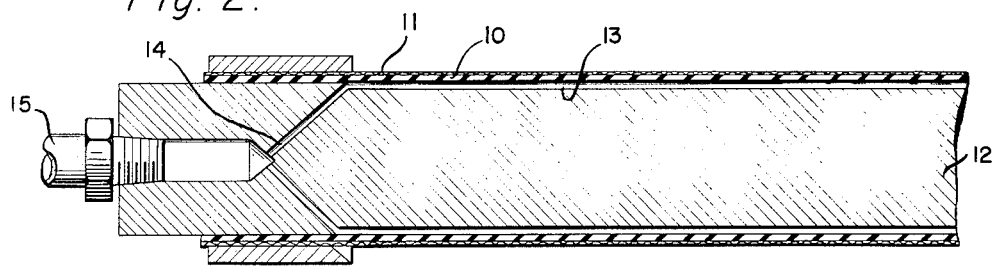
FIG. 2 is a longitudinal transverse cross sectional view illustrating the assembly of the hose body upon a mandrel.
Figure 3:
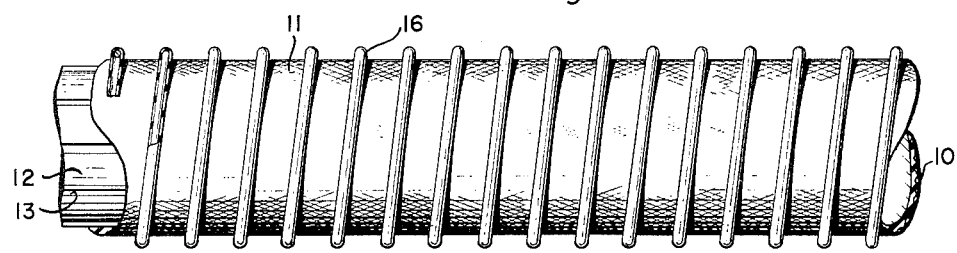
FIG. 3 is a view in elevation and partly in cross section illustrating the assembly of the reinforcing member over the hose body.

In accordance with the present invention, a preformed tubular hose body 10 of elastomeric material, such as vulcanizable rubber or synthetic rubber composition, is provided, as shown in FIG. 1. This tubular member is preferably formed by extrusion to the desired length and diameter and having the desired thickness. Over this tubular member a layer of open mesh fabric 11, such as an open mesh braided material produced in a braiding machine, is drawn, as illustrated in FIG. 1. Where a fabric reinforced hose is not desired, this fabric layer may be omitted. An elongate mandrel 12, as shown in FIG. 2, is positioned within tubular member 10. The mandrel is provided with longitudinal channels 13 extending in a spaced manner around the surface thereof, these channels communicating with passages 14 through one end of the mandrel communicating with an opening 15 which, in turn, is connected to a source of fluid, such as air or steam under pressure. After the tube 10 and its fabric layer 11 are positioned upon the mandrel, reinforcing member 16 is positioned thereover, as shown in FIG. 3. This reinforcing member is preferably in the form of a helical spring with spaced convolutions which may be wound around the surface of the tube or may be preformed with the desired degree of spacing. Alternatively, the spring member may be preformed with its coil close together and then positioned over the tube on the mandrel and stretched longitudinally so that the coils will have the desired spacing, the ends thereof thereafter being taped down against the tube on the mandrel. In order to maintain the proper spacing of the convolutions, tubular layer 10 may be expanded slightly against the inner surface of the spring by applying a slight degree of pressure against the interior of the tube through opening 15, channels 14, and along longitudinal channels 13. The reinforcing member 16 may be of bare steel spring wire, but is preferably coated with a layer of elastomeric material, which will be compatible with the material of the tubular member 10, in order to facilitate the bonding and embedding of the reinforcing member during vulcanization.

Figure 4:
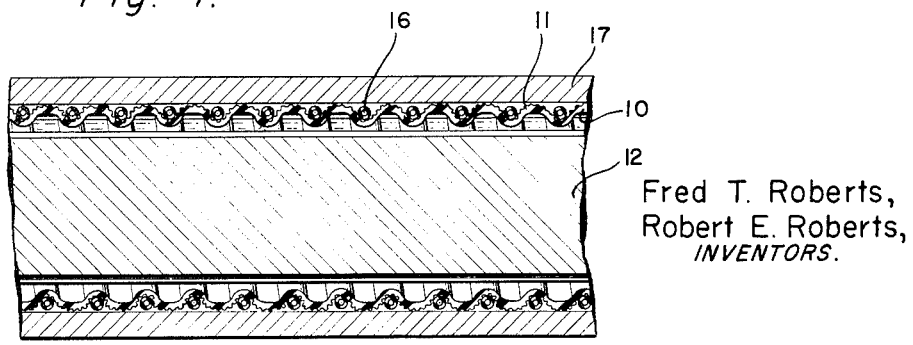
FIG. 4 is a longitudinal cross sectional view illustrating the assembly of the hose body on the mandrel positioned within a mold.
Figure 5:
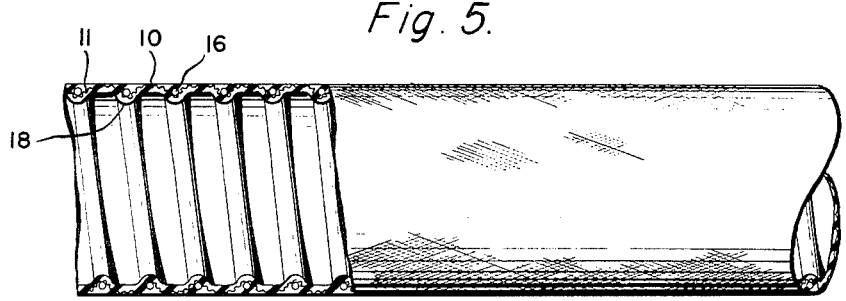
FIG. 5 is a view partly in elevation and partly in cross section illustrating the structure of a hose produced in accordance with the method illustrated in FIGS. 1 to 4.

Thereafter, the assembly on the mandrel is introduced within a cylindrical mold member 17, as shown in FIG. 4, which may be in the form of a hollow pipe having a smooth interior surface or may be a two-part cylindrical mold. Air or steam under pressure is intoduced interiorly of tube 10 through inlet 15 and channels 14 and 13, causing the tube to expand further and force it against the interior surface of the mold and around the convolution. At the same time, heat is applied to the mold by introducing it into a heating chamber, or by the use of heated air or steam introduced internally of the tube, or both, causing the material of the tube to flow through the fabric reinforcement and conform to the surface of the mold. Fluid under pressure and heat is applied until vulcanization or curing of the elastomeric material is effected, and the mold then allowed to cool, after which the pressure is reduced and the mandrel and tube withdrawn from the mold. In the case of a vulcanizable rubber compound, temperatures ranging from 275 to 350 degrees F. for a period of one-half to one hour at pressures of 10 to 30 p.s.i. will generally suffice to effect the cure. The resulting product is illustrated in FIG. 5, which shows a segment of an elongated, smooth surfaced hose body in which reinforcing member 16 and fabric 11 are integrally embedded within the tubular body 10, and in which internal corrugations 18 have been formed as the result of the internal pressure which has been applied, as described above. As shown, the fabric reinforcing member has been formed into a convoluted configuration conforming to the corrugations of the inner surface, due to the fact that the fabric is restrained by the reinforcements and forced upward therebetween.

Figure 6:
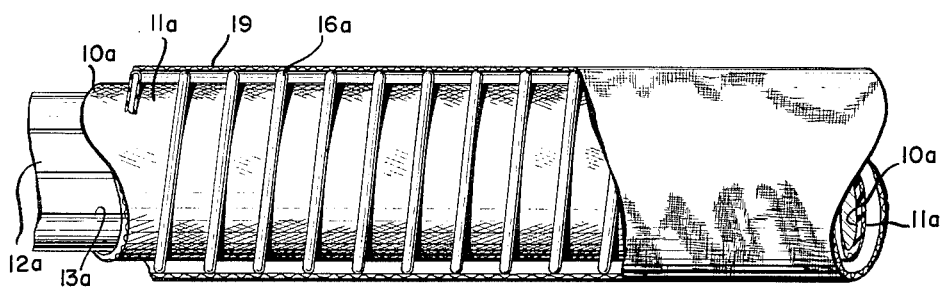
FIG. 6 is a view partly in elevation and partly in cross section illustrating an assembled hose body prior to molding of a modified form of the invention.
Figure 7:
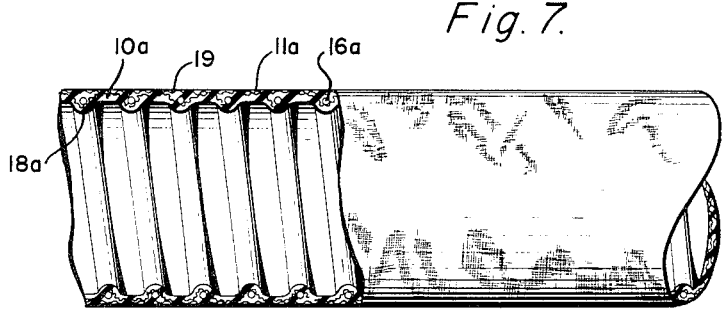
FIG. 7 is a view partly in elevation and partly in cross section illustrating the structure of a molded hose resulting from the assembly illustrated in FIG. 6.

A modified form of the invention is illustrated in FIGS. 6 and 7. As illustrated, a tubular elastomeric body 10a is positioned on a mandrel 12a. Helical spring reinforcing member 16a having its convolutions spaced in a predetermined desired manner is positioned over the tubular member 10a, as shown. A layer 11a of open mesh fabric, as illustrated in FIG. 1, may also be applied. Thereafter, a layer 19 of fabric, which may be of open mesh type or may be of a close weave construction, is positioned over the reinforcements. The mandrel is perforated or provided with channels, as illustrated in FIG. 2, so that fluid introduced under pressure can cause expansion of the tube outwardly against the surface of the mold. The assembly is introduced into a mold of the type referred to in connection with FIG. 4 and expansion and curing carried out in the same manner as described above, with the result that vulcanization or curing of the elastomeric material takes place with the formation of a smooth surfaced product. The resulting product is illustrated in FIG. 7, which shows a smooth surfaced hose having an elastomeric body 10a with reinforcing member 16a and fabric 11a embedded therein. The outer fabric layer 19 has become bonded to or embedded in the surface of the hose, as shown. If desired, the inner layer of fabric 11a may be omitted, but where incorporated, the hose will possess the dual fabric reinforcement on both sides of the wire reinforcing member 16 so that such member is retained in position between two layers of fabric. At the same time, the hose will have internal corrugations 18a and will be highly flexible while at the same time having an outer fabric surface caused by the bonding or embedding of the outer fabric layer 19.

The mandrels utilized may be of any desired length, depending upon the length of the hose to be produced, and would generally be in the range of from a few feet up to about 25 feet, but may be shorter or longer. The structure of the mandrel is such as to permit the application of internal pressure of to expand the tube positioned thereon, and one simple form thereof has been illustrated in FIG. 2 described above. However, other types of mandrels may be utilized; for example of the type illustrated in applicants' aforementioned patent, such mandrels having a plurality of perforations or an expansible sleeve positioned thereon.

Various other embodiments of the invention will occur to those skilled in the art, it being understood that such embodiments are within the scope of the invention as set forth in the appended claims.

We claim:
1. In a method of manufacturing elongate reinforced hose comprising a smooth cylindrical molded outer surface, a continuous helical reinforcing member embedded in the body and internal corrugations formed between the helices of said reinforcing member, the steps of preforming a tubular layer of elastomeric material, applying over the surface of said tubular layer a layer of open mesh fabric, applying over said tubular layer and layer of fabric and in contact with the surface thereof a continuous helical reinforcing member having spaced convolutions with said layers holding said convolutions in the proper position, inserting said assembled tubular layer, fabric layer and reinforcing member within a mold cavity having a surface to form the cylindrical surface of the hose applying internal pressure and heat within said tubular layer of elastomeric material and causing said material thereof to move outwardly through said fabric and around the reinforcing member and into engagement with the surface of the cavity to mold the cylindrical outer surface of the hose with the movement of the elastomeric material stretching the fabric lying between the convolutions of the reinforcing member outwardly and forming the internal surface of the hose with corrugations between the convolutions of the reinforcing member, continuing the heat and pressure to set the material in its molded state, and thereafter removing the resulting product from the mold.

2. In a method of manufacturing elongate reinforced hose comprising a smooth cylindrical molded outer surface, a continuous helical reinforcing member embedded in the body and internal corrugations formed between the helices of said reinforcing member, the steps of preforming a tubular layer of elastomeric material, applying over the surfaces of said tubular layer an inner layer of open mesh fabric, applying over said tubular layer and layer of fabric and in contact with the surface thereof a continuous helical reinforcing member having spaced convolutions with said tubular layer holding said convolutions in proper position, applying an outer layer of fabric over the reinforcing member, inserting said assembled tubular layer, fabric layers and reinforcing member within a mold cavity having a surface to form the cylindrical surface of the hose, applying internal pressure and heat within said tubular layer of elastomeric material and causing said material thereof to move outwardly through said fabric layers and around the reinforcing member and into engagement with the surface of the cavity to mold the cylindrical outer surface of the hose having the outer layer of fabric embedded therein with the movement of the material outwardly stretching the inner layer of fabric between the convolutions of the reinforcing member and forming the internal surface of the hose with corrugations between the convolutions of the reinforcing member, continuing the heat and pressure to set the material in its molded state, and thereafter removing the resulting product from the mold.

References Cited by the Examiner
UNITED STATES PATENTS

| | | | |
|---|---|---|---|
| 2,584,401 | 2/1952 | Roberts | 138—122 XR |
| 2,780,274 | 2/1957 | Roberts et al. | 156—144 |
| 2,830,622 | 4/1958 | Roberts et al. | 138—121 |

EARL M. BERGERT, *Primary Examiner.*

UNITED STATES PATENT OFFICE
CERTIFICATE OF CORRECTION

Patent No. 3,223,760                              December 14, 1965

Fred T. Roberts et al.

It is hereby certified that error appears in the above numbered patent requiring correction and that the said Letters Patent should read as corrected below.

Column 4, line 7, for "embeded" read -- embedded --; line 22, strike out "of", second occurrence; line 47, after "hose" insert a comma.

Signed and sealed this 18th day of October 1966.

(SEAL)
Attest:

ERNEST W. SWIDER                                 EDWARD J. BRENNER
Attesting Officer                                      Commissioner of Patents